United States Patent [19]

Brown

[11] 4,187,178
[45] Feb. 5, 1980

[54] HOLDER FOR FILTER SCREENS

[76] Inventor: David S. Brown, 3957 W. Lawrence Ave., Chicago, Ill. 60625

[21] Appl. No.: 942,986

[22] Filed: Sep. 18, 1978

[51] Int. Cl.² ............................................ B01D 29/00
[52] U.S. Cl. .................................... 210/232; 210/460
[58] Field of Search ................. 128/66; 210/167, 169, 210/473, 477, 460, 232, 258

[56] References Cited

U.S. PATENT DOCUMENTS

| | | | |
|---|---|---|---|
| 1,530,845 | 3/1925 | Milkey | 210/477 X |
| 2,027,826 | 1/1936 | Keaton | 210/477 |
| 2,738,787 | 3/1956 | Jacuzzi | 128/66 |
| 3,835,846 | 9/1974 | Kurtz | 128/66 |

FOREIGN PATENT DOCUMENTS 295812 8/1928 United Kingdom ..................... 210/477

*Primary Examiner*—Charles N. Hart
*Assistant Examiner*—Richard W. Burks
*Attorney, Agent, or Firm*—Rummler & Snow

[57] ABSTRACT

A device for removing and replacing a filter screen in a whirlpool apparatus wherein the filter screen is supported on a ledge in the lower end of the apparatus, the stem of the device both carrying the filter and anchored through an aperture in the hub of the whirlpool apparatus in the usual way and the lower face of the screen being provided with equi-spaced arms, the ends of which terminate in apertures in the skirt of the apparatus to support the screen.

1 Claim, 5 Drawing Figures

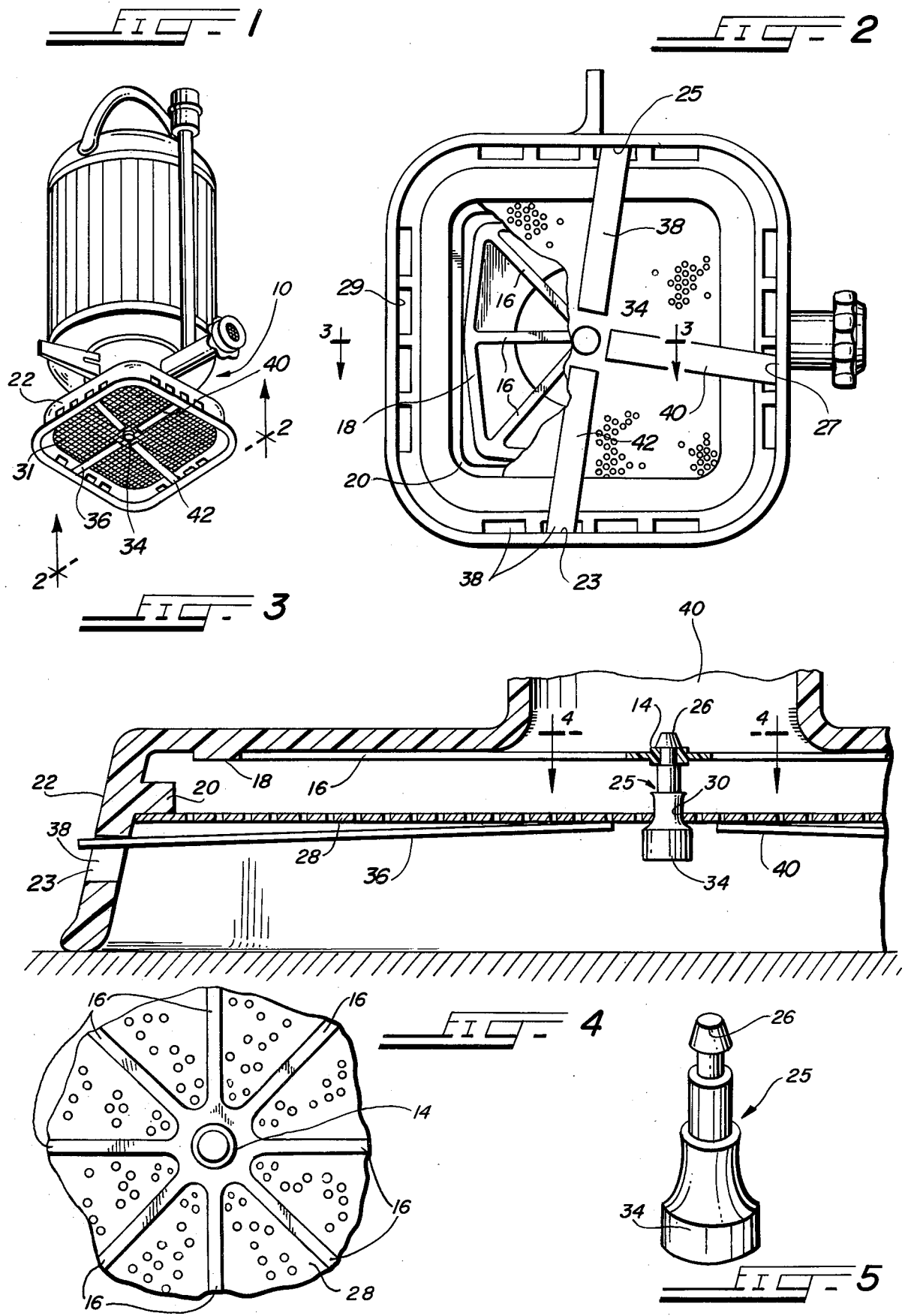

HOLDER FOR FILTER SCREENS

BACKGROUND OF THE INVENTION

Substantially all whirlpool apparatus is provided with a filter screen at its lower end through which the tub water is recirculated. The filter screen is usually square and having a wafer-like thickness and is very fragile with minute allover perforations therein to keep objects from the interior of the apparatus. The usual filter screen is provided with a small, axial, plastic button member to removably anchor the screen adjacent the spokes of the apparatus. The filter screen must be removed and cleaned at least twice a week and such constant removal and cleaning with improper or careless removal by the plastic button from the apparatus causes the screen and the button to break or the screen to crack so that the button tears away from the filter screen and the filter becomes useless. It was to overcome this defect that the present invention was conceived.

SUMMARY OF THE INVENTION

An improved means for anchoring and removing the screen from a whirlpool bath apparatus having a vertical, preformed stem, the upper end of said stem being insertable in the usual aperture in a hub of the spokes on the lower end of the apparatus, a head on the free end of said stem for carrying a filter plate and equi-distantly-spaced ribs on the lower end of said filter extending beyond the margins of the filter for projecting into the perforations of the skirt of the whirlpool apparatus.

BRIEF DESCRIPTION OF THE DRAWINGS

FIG. 1 is a perspective view of a whirlpool apparatus;

FIG. 2 is a bottom plan view taken on the lines 2—2 of FIG. 1;

FIG. 3 is an enlarged cross-sectional view taken on the lines 3—3 of FIG. 2 with parts broken away;

FIG. 4 is a plan view taken on the lines 4—4 of FIG. 3 with parts broken away; and FIG. 5 is an enlarged perspective view of the stem of the present invention.

DETAILED DESCRIPTION OF THE DRAWINGS

The whirlpool apparatus is the same that is on the open market, the details of which may be found in U.S. Pat. No. 2,738,787 and others, including the filter screen and the metal hub and spokes.

The hub and spokes are molded to the lower end of the apparatus 10 and comprise eight spokes 16 starting at the hollow hub 14 and terminating at and formed on an octagon-like shaped outer rim 18. It is to be noted that the rim 18 is spaced inwardly from the inner periphery of the ledge 20 formed on the depending skirt or apron 22 forming the seat for the apparatus. The screen filter 28 seats against the ledge 20.

The screen filter is semi-flexible and substantially square in shape and very thin. The filter is provided with an allover pattern or perforations.

The plastic holding device of the present invention comprises a stem 25 having an enlarged head 26 on one end. The free end of the stem 25 is inserted in and through the aperture 30 in the filter screen, as shown in FIG. 3, and upwardly through the hub 14 forcibly to be positioned thereon. The stem is constructed of plastic. The lower end of the stem is provided with a handle portion 34 which lies against the bottom wall of the filter screen.

By holding the handle 34 of the stem 25 against the lower end of the hollow hub 14 and continuing the upward movement, the head 28 will readily be inserted in and through the aperture in the hub 24, and lie against the upper surface of the hub 14 to hold the filter screen against the ledges 20.

Ribs 36, 38, 40, 42 are secured at their inner surfaces to the lower face of the screen 28 and extend outwardly beyond the margin of the screen to seat in the apertures 23, 25, 27, 29 in the shirt 22. The ribs are made from flexible plastic so as to easily slide over the bottom of the inner wall of the skirt during placement or removal of the filter and into or out of the seats formed by apertures 23, 25, 27, 29. Thus the ribs will readily support the filter against the lower edge of the ledges 20.

As usual, the water in the tub will flow through all the apertures in the skirt 22 of the apparatus 10, and thence upwardly through the filter and thence through the opening 40 in the whirlpool apparatus. This action occurs when the motor in the apparatus is energized to rotate the impeller to draw the water upwardly as stated.

Although but one specific embodiment of this invention is herein shown and described, it will be understood that details of the construction shown may be altered or omitted without departing from the spirit of the invention as defined by the following claim.

I claim:

1. A device for removing and replacing a thin filter screen positioned in the lower end of a whirlpool bath apparatus, said apparatus comprising a skirt on its lower end, said skirt having spaced perforations therein, a hollow hub in the lower end of said apparatus, a filter screen, a stem having an enlarged head on one end forming a handle and the other end provided with an enlarged head for seating on said hub, said filter screen supported on said stem between the ends thereof, and ribs anchored to said screen and extending outwardly radially with the ends thereof seated in said perforations.

* * * * *